US012779931B2

(12) United States Patent
Konno

(10) Patent No.: US 12,779,931 B2
(45) Date of Patent: Nov. 3, 2026

(54) VEHICLE AIR CONDITIONING SYSTEM

(71) Applicant: NGK INSULATORS, LTD., Nagoya-City (JP)

(72) Inventor: Yoshiki Konno, Tajimi (JP)

(73) Assignee: NGK INSULATORS, LTD., Nagoya (JP)

( * ) Notice: Subject to any disclaimer, the term of this patent is extended or adjusted under 35 U.S.C. 154(b) by 330 days.

(21) Appl. No.: 18/671,048

(22) Filed: May 22, 2024

(65) Prior Publication Data

US 2024/0424854 A1 Dec. 26, 2024

(30) Foreign Application Priority Data

Jun. 22, 2023 (JP) ................................ 2023-102760

(51) Int. Cl.
*B60H 1/00* (2006.01)
*B60H 3/02* (2006.01)

(52) U.S. Cl.
CPC ..... *B60H 1/00028* (2013.01); *B60H 1/00785* (2013.01); *B60H 3/024* (2013.01); *B60H 2001/00092* (2013.01)

(58) Field of Classification Search
CPC ....................... B60H 1/00028; B60H 1/00785; B60H 3/024; B60H 2001/00092
USPC .......................................................... 454/152
See application file for complete search history.

(56) References Cited

U.S. PATENT DOCUMENTS 5,938,523 A * 8/1999 Khelifa .................. F24F 8/108 96/127
11,684,889 B2 * 6/2023 Matsumoto ........ B01D 53/0438 95/26
2020/0223293 A1 7/2020 Matsumoto et al.
2021/0041141 A1 2/2021 Miyairi et al.

FOREIGN PATENT DOCUMENTS

JP 2020-104774 A 7/2020
JP 2020-111282 A 7/2020
WO 2020/036067 A1 2/2020

* cited by examiner

*Primary Examiner* — Avinash A Savani
*Assistant Examiner* — Dana K Tighe
(74) *Attorney, Agent, or Firm* — Muncy, Geissler, Olds & Lowe, P.C.

(57) ABSTRACT

A vehicle air conditioning system includes: an air conditioning device; a power source; an inflow pipe for allowing air from a vehicle interior or a vehicle exterior to flow into the air conditioning device; a first outflow pipe for returning the air that has passed through the air conditioning device to the vehicle interior; a second outflow pipe for discharging the air that has passed through the air conditioning device to the vehicle exterior; a differential pressure valve being capable of switching the flow of the air to the first outflow pipe or the second outflow pipe; a first ventilator for controlling the differential pressure valve to switch the flow of the air to the first outflow pipe; and a second ventilator for controlling the differential pressure valve to switch the flow of the air to the second outflow pipe.

11 Claims, 5 Drawing Sheets

VEHICLE AIR CONDITIONING SYSTEM

CROSS REFERENCE TO RELATED APPLICATIONS

The present invention claims the benefit of priority to Japanese Patent Application No 2023-102760 filed on Jun. 22, 2023 with the Japanese Patent Office, the entire contents of which are incorporated herein by reference in its entirety.

FIELD OF THE INVENTION

The present invention relates to a vehicle air conditioning system.

BACKGROUND OF THE INVENTION

In various types of vehicles such as automobiles, there are increasing requirements for improvement of vehicle interior environment. Specific requirements include reduction of an amount of $CO_2$ in the vehicle interior to suppress driver's drowsiness, control of humidity in the vehicle interior, and removal of harmful volatile components such as odor components and allergy-causing components in the vehicle interior. The effective measure for such requirements includes ventilation, but the ventilation causes a large loss of heater energy in winter, leading to a decreased energy efficiency in winter. In particular, a battery electric vehicle (BEV) has a problem that its cruising range is significantly reduced due to its energy loss.

As a method for solving the above problem, Patent Literatures 1 and 2 disclose a vehicle air conditioning system in which components to be removed such as $CO_2$ and water vapor in the air in the vehicle interior are trapped by a functional material such as an adsorbent, and the components to be removed are then reacted or desorbed by heating to discharge them to the vehicle exterior and regenerate the functional material. Such a vehicle air conditioning system requires more contact between the air and the functional material in order to ensure the performance of trapping the components to be removed, and the ability of the functional material to be heated to a predetermined temperature in order to facilitate the regeneration of the functional material. The regeneration can be carried out, for example, by removing the components to be removed, which are adsorbed on the functional material, through an oxidation reaction, and by desorbing and releasing the components to be removed, adsorbed on the functional material, but both cases require the heating of the functional material at an appropriate temperature depending on the type of the adsorbed components to be removed.

On the other hand, Patent Literature 3 discloses a heater element, including: a pillar shaped honeycomb structure having an outer peripheral wall and partition walls disposed on an inner side of the outer peripheral wall and defining a plurality of cells forming flow paths from a first end face to a second end face, wherein the partition walls have a PTC property, the partition walls have an average thickness of 0.13 mm or less, and the first end face and the second end face have an opening ratio of 0.81 or more. This heater element is used for heating a vehicle interior, and is an efficient heating means because the honeycomb structure allows the heating area to be increased. Therefore, the use of such a heater element as a support for the functional material can contribute to the shortening of the regeneration time of the functional material. In particular, it is believed that since this heater element can be heated by electric conduction and has a PTC property, it can easily heat the functional material, while suppressing excessive heat generation and thermal deterioration of the functional material. Further, since the risk of excessive temperature is avoided, safety can be ensured even if small initial resistance is set to increase a heating rate, and the temperature can be increased in a short period of time.

In conventional vehicle air conditioning systems, the flow of air is controlled by electrically driven switching valves (opening and closing doors). Specifically, the flow of the air is controlled by the electrically driven switching valve provided at a branch portion between a flow path for returning the air in which the components to be removed are trapped by a functional material to the vehicle interior and a flow path for causing the components to be removed that have been trapped by the functional material to be reacted or separated to release them to the vehicle exterior. However, when using such an electrically driven switching valve, it is necessary to provide a drive portion for driving the switching valve. Since the area around the branch portion of the flow paths has a complicated structure, there may not be sufficient space to provide the drive portion, and the provision of the drive portion increases the size of the system.

The present invention was made to solve the problems as described above. An object of the present invention is to provide a vehicle air conditioning system capable of making the flow path structure simple and compact.

PRIOR ART

Patent Literatures

[Patent Literature 1] Japanese Patent Application Publication No. 2020-104774 A

[Patent Literature 2] Japanese Patent Application Publication No. 2020-111282 A

[Patent Literature 3] WO 2020/036067 A1

SUMMARY OF THE INVENTION

As a result of extensive studies for vehicle air conditioning systems, the present inventor has found that the above problems can be solved by providing a differential pressure valve that can be driven by controlling a ventilator, instead of the electrically driven switching valve, and has completed the present invention. That is, the present invention is illustrated as follows:

(1)

A vehicle air conditioning system, comprising:

an air conditioning device comprising: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC property; a pair of electrodes provided on the first end face and the second end face; and a functional material-containing layer formed on a surface of each of the partition walls;

a power source for applying voltage to the pair of electrodes;

an inflow pipe for allowing air from a vehicle interior or a vehicle exterior to flow into the air conditioning device;

a first outflow pipe for returning the air that has passed through the air conditioning device to the vehicle interior;

a second outflow pipe for discharging the air that has passed through the air conditioning device to the vehicle exterior;

a differential pressure valve provided at a branch portion between the first outflow pipe and the second outflow pipe, the differential pressure valve being capable of switching the flow of the air to the first outflow pipe or the second outflow pipe;

a first ventilator for controlling the differential pressure valve to switch the flow of the air to the first outflow pipe; and a second ventilator for controlling the differential pressure valve to switch the flow of the air to the second outflow pipe.

(2)

The vehicle air conditioning system according to (1), wherein the first outflow pipe and the second outflow pipe have a double pipe structure in which the second outflow pipe is disposed within the first outflow pipe at the branch portion between the first outflow pipe and the second outflow pipe.

(3)

The vehicle air conditioning system according to (1) or (2), wherein the first ventilator is disposed in the inflow pipe.

(4)

The vehicle air conditioning system according to any one of (1) to (3), wherein the second ventilator is disposed in the second outflow pipe.

(5)

The vehicle air conditioning system according to any one of (1) to (4), wherein the material having the PTC property comprises barium titanate as a main component.

(6)

The vehicle air conditioning system according to any one of (1) to (5), wherein the functional material-containing layer comprises an adsorbent having a function of adsorbing at least one selected from water vapor, carbon dioxide, and volatile components.

(7)

The vehicle air conditioning system according to any one of (1) to (6), wherein the functional material-containing layer comprises a catalyst.

(8)

The vehicle air conditioning system according to (6) or (7), wherein the adsorbent is a moisture absorbent.

(9)

The vehicle air conditioning system according to (8), further comprising a control unit, wherein the control unit can execute:

a dehumidification mode where the vehicle interior is dehumidified by activating the first ventilator and controlling the differential pressure valve to switch the flow of the air to the first outflow pipe; and a regeneration mode where the functional material-containing layer is regenerated by activating the second ventilator, applying a voltage to the pair of electrodes of the air conditioning device, and controlling the differential pressure valve to switch the flow of the air to the second outflow pipe.

(10)

The vehicle air conditioning system according to (9), further comprising a detection portion capable of detecting fogging of glass in the vehicle interior, wherein the control portion executes the regeneration mode when the fogging of the glass is detected, and the control portion executes the dehumidification mode when the fogging of the glass is not detected.

(11)

The vehicle air conditioning system according to (10), wherein the detection portion detects the fogging of the glass based on a temperature and a humidity in the vehicle interior.

DETAILED DESCRIPTION OF THE INVENTION

Figure 1:
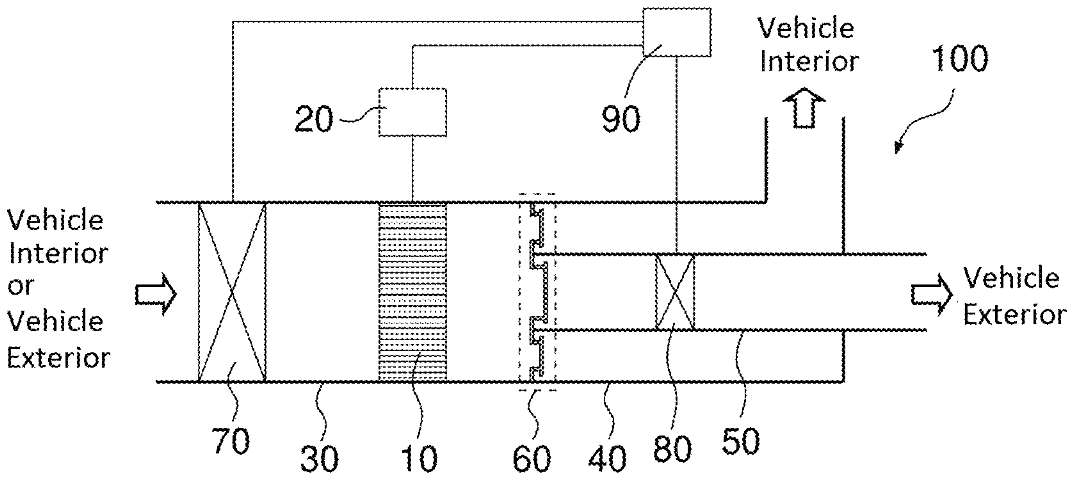
FIG. 1 is a schematic configuration view of a vehicle air conditioning system according to an embodiment of the present invention.

The vehicle air conditioning system according to the present invention includes: an air conditioning device including: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a PTC (Positive Temperature Coefficient) property; a pair of electrodes provided on the first end face and the second end face; and a functional material-containing layer formed on a surface of each of the partition walls; a power source for applying voltage to the pair of electrodes; an inflow pipe for allowing air from a vehicle interior or a vehicle exterior to flow into the air conditioning device; a first outflow pipe for returning the air that has passed through the air conditioning device to the vehicle interior; a second outflow pipe for discharging the air that has passed through the air conditioning device to the vehicle exterior; a differential pressure valve provided at a branch portion between the first outflow pipe and the second outflow pipe, the differential pressure valve being capable of switching the flow of the air to the first outflow pipe or the second outflow pipe; a first ventilator for controlling the differential pressure valve to switch the flow of the air to the first outflow pipe; and a second ventilator for controlling the differential pressure valve to switch the flow of the air to the second outflow pipe. By having such a configuration, the vehicle air conditioning system according to the present invention can simplify the flow path structure as compared to the case where a conventional electrically driven switching valve (opening and closing door) is used. Further, since the vehicle air conditioning system according to the present invention does not require a drive portion to be provided around the branch portion as in the case where the conventional electrically driven switching valve (opening and closing door) is used, the compactification of the system can be achieved.

Hereinafter, embodiments of the present invention will be specifically described with reference to the drawings. It is to understand that the present invention is not limited to the following embodiments, and those which have appropriately added changes, improvements and the like to the following embodiments based on knowledge of a person skilled in the art without departing from the spirit of the present invention fall within the scope of the present invention.

The vehicle air conditioning system according to an embodiment of the present invention can be suitably utilized for various vehicles such as automobiles. The vehicle includes, but not limited to, automobiles and trains. Non-limiting examples of the automobile include a gasoline vehicle, a diesel vehicle, a gas fuel vehicle using CNG (a compressed natural gas) or LNG (a liquefied natural gas), a fuel cell vehicle, an electric vehicle, and a plug-in hybrid vehicle. The vehicle air conditioning system according to the embodiment of the present invention can be particularly suitably used for a vehicle having no internal combustion engine such as electric vehicles and electric railcars.

Figure 2A:
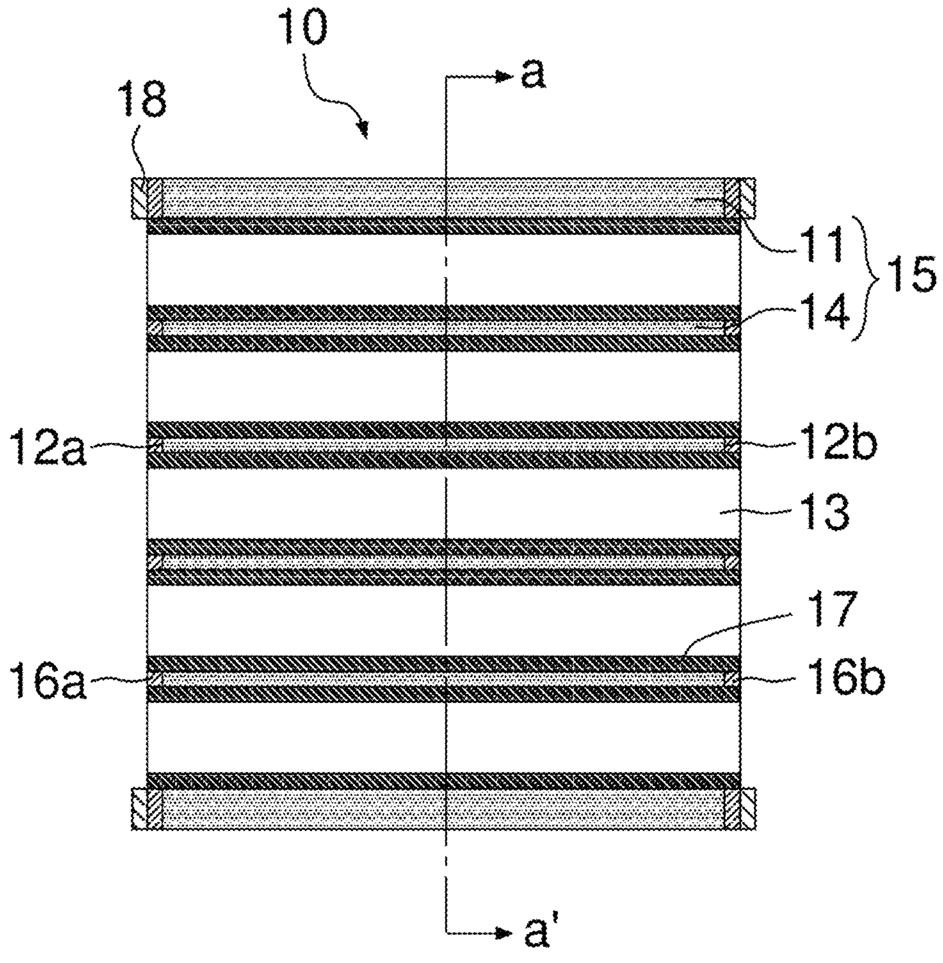
FIG. 2A is a schematic view of a cross section of an air conditioning device used in a vehicle air conditioning system according to an embodiment of the present invention, which is parallel to a flow path direction.
Figure 2B:
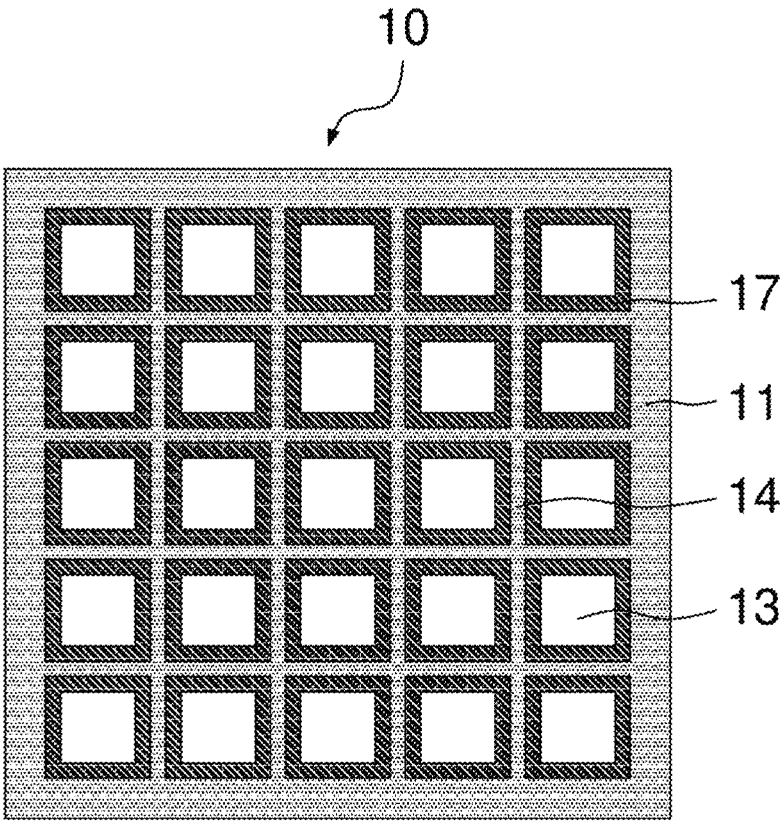
FIG. 2B is a schematic cross-sectional view of the air conditioning device in FIG. 2A taken along the line a-a'.

FIG. 1 is a schematic configuration view of a vehicle air conditioning system according to an embodiment of the present invention. FIG. 2A is a schematic view of a cross section of an air conditioning device used in a vehicle air conditioning system according to an embodiment of the present invention, which is parallel to a flow path direction. FIG. 2B is a schematic cross-sectional view of the air conditioning device in FIG. 2A taken along the line a-a'.

As shown in FIG. 1, a vehicle air conditioning system 100 according to an embodiment of the present invention includes: an air conditioning device 10; a power source 20; an inflow pipe 30; a first outflow pipe 40; a second outflow pipe 50; a differential pressure valve 60; a first ventilator 70; and a second ventilator 80. Also, the vehicle air conditioning system 100 can further include a control unit 90 for controlling the power source 20, the first ventilator 70, the second ventilator 80, and the like.

As shown in FIGS. 2A and 2B, the air conditioning device 10 includes: a honeycomb structure 15 having an outer peripheral wall 11 and partition walls 14 disposed on an inner side of the outer peripheral wall 11 and defining a plurality of cells 13 each extending from a first end face 12*a* to a second end face 12*b* to form a flow path; a pair of electrodes 16*a*, 16*b* provided on the first end face 12*a* and the second end face 12*b*; and a functional material-containing layer 17 formed on a surface of each partition wall 14. The power source 20 can apply a voltage to the pair of electrodes 16*a*, 16*b*. The inflow pipe 30 can allow the air from the vehicle interior or the vehicle exterior to flow into the air conditioning device 10. The first outflow pipe 40 can return the air that has passed through the air conditioning device 10 to the vehicle interior. The second outflow pipe 50 can discharge the air that has passed through the air conditioning device 10 to the vehicle exterior. The differential pressure valve 60 is provided at a branch portion between the first outflow pipe 40 and the second outflow pipe 50, and can switch the flow of the air to the first outflow pipe 40 or the second outflow pipe 50. The first ventilator 70 can control the differential pressure valve 60 to switch the flow of the air to the first outflow pipe 40. The second ventilator 80 can control the differential pressure valve 60 to switch the flow of the air to the second outflow pipe 50.

In the vehicle air conditioning system 100 having the above configuration, the air from the vehicle interior or the vehicle exterior flows into the air conditioning device 10 through the inflow pipe 30, and components to be removed in the air are trapped (removed) by the functional material-containing layer 17 while the air passes through the air conditioning device 10. Then, the air with reduced components to be removed returns to the vehicle interior through the first outflow pipe 40. Such a mode where the components to be removed contained in the air from the vehicle interior or the vehicle exterior are removed and returned to the vehicle interior refers to an air conditioning mode.

On the other hand, the performance of the functional material-containing layer 17 gradually decreases as amounts of trapped components to be removed increase. Therefore, the functional material-containing layer 17 must be regenerated. The functional material-containing layer 17 is regenerated by applying a voltage to the pair of electrodes 16*a*, 16*b* to heat the honeycomb structure 15. Since the functional material-containing layer 17 is directly heated by the heating of the honeycomb structure 15, the components to be removed that are trapped by the functional material-containing layer 17 are efficiently desorbed or reacted and released from the functional material-containing layer 17, and are discharged to the vehicle exterior through the second outflow pipe 50. Such a mode where the functional material-containing layer 17 is regenerated refers to a regeneration mode.

Figure 3A:
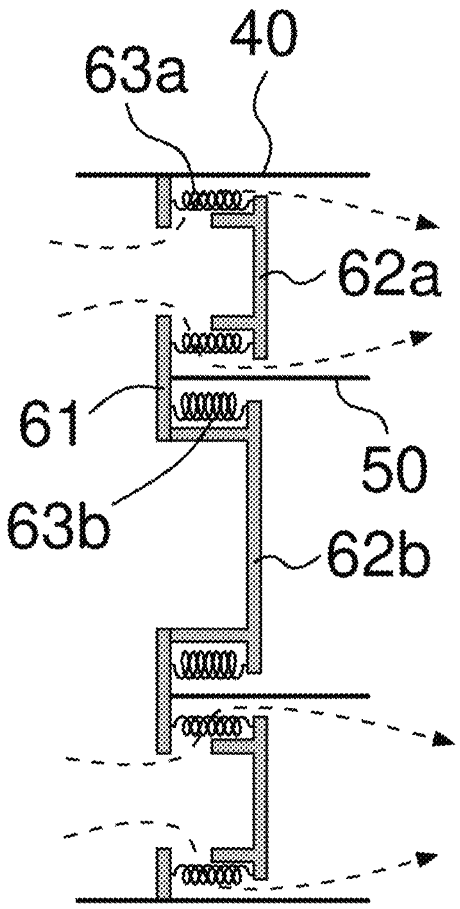
FIG. 3A is a partially enlarged view showing a state of a differential pressure valve in an air conditioning mode.
Figure 3B:
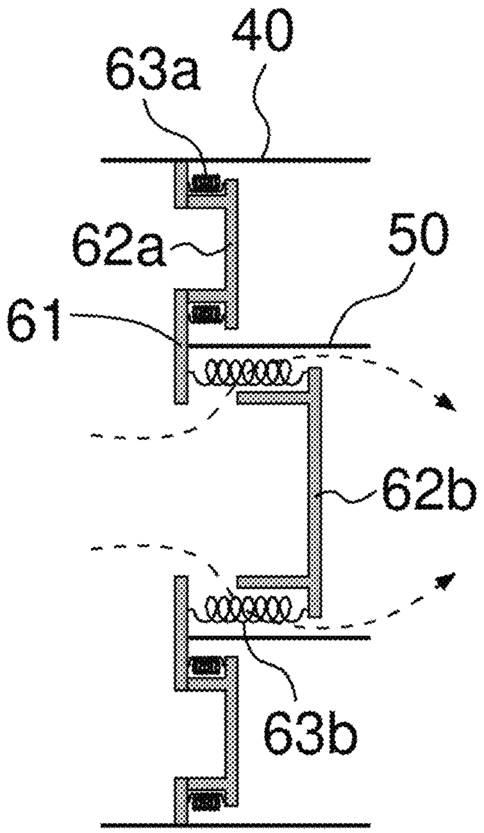
FIG. 3B is a partially enlarged view showing a state of a differential pressure valve in a regeneration mode.

Here, FIG. 3A illustrates a partially enlarged view showing the state of the differential pressure valve 60 in the air conditioning mode, and FIG. 3B illustrates a partially enlarged view showing the state of the differential pressure valve 60 in the regeneration mode.

In the air conditioning mode, the differential pressure valve 60 is controlled to switch the flow of the air to the first outflow pipe 40, as shown in FIG. 3A, by stopping the second ventilator 80 and activating the first ventilator 70. Also, in the regeneration mode, the differential pressure valve 60 is controlled to switch the flow of the air to the second outflow pipe 50, as shown in FIG. 3B, by stopping the first ventilator 70 and activating the second ventilator 80. Since the differential pressure valve 60 can be controlled by the first ventilator 70 and the second ventilator 80, there is no need to provide a drive portion around the switching valve as in the case where a conventional electric switching valve (opening and closing door) is used.

Each component of the vehicle air conditioning system 100 will be described in detail below.

1. Air Conditioning Device 10

As shown in FIGS. 2A and 2B, the air conditioning device 10 includes: a honeycomb structure 15 having an outer peripheral wall 11 and partition walls 14 disposed on an inner side of the outer peripheral wall 11, the partition walls 14 defining a plurality of cells 13 each extending from a first end face 12*a* to a second end face 12*b* to form a flow path; a pair of electrodes 16*a*, 16*b* provided on the first end face 12*a* and the second end face 12*b*; and a functional material-containing layer 17 formed on a surface of each partition wall 14. Also, the air conditioning device 10 can further include terminals 18 connected to the pair of electrodes 16*a*, 16*b*, if necessary.

1-1. Honeycomb Structure 15

The shape of the honeycomb structure 15 is not particularly limited. For example, an outer shape of a cross section of the honeycomb structure 15 orthogonal to the flow path direction (the extending direction of the cells 13) can be polygonal such as quadrangular (rectangular, square), pentagonal, hexagonal, heptagonal, and octagonal, circular, oval (egg-shaped, elliptical, elliptic, rounded rectangular, etc.), or the like. The end faces (first end face 12*a* and second end face 12*b*) have the same shape as the cross section. Also, when the cross section and the end faces are polygonal, the corners may be chamfered.

The shape of each cell 13 is not particularly limited, but it may be polygonal such as quadrangular, pentagonal, hexagonal, heptagonal, and octagonal, circular, or oval in the cross section of the honeycomb structure 15 orthogonal to the flow path direction. These shapes may be alone or in combination of two or more. Moreover, among these shapes, the quadrangle or the hexagon is preferable. By providing the cells 13 having such a shape, it is possible to reduce the pressure loss when the air flows.

The honeycomb structure 15 may be a honeycomb joined body having a plurality of honeycomb segments and joining layers that join outer peripheral side surfaces of the plurality of honeycomb segments together. The use of the honeycomb joined body can increase the total cross-sectional area of the cells 13, which is important for ensuring the flow rate of air, while suppressing cracking.

It should be noted that the joining layer can be formed by using a joining material. The joining material is not particularly limited, but a ceramic material obtained by adding a solvent such as water to form a paste can be used. The joining material may contain a material having the PTC property, or may contain the same material as the outer peripheral wall 11 and the partition walls 14. In addition to the role of joining the honeycomb segments to each other, the joining material can also be used as an outer peripheral coating material after joining the honeycomb segments.

From the viewpoints of ensuring the strength of the honeycomb structure 15, reducing pressure loss when air passes through the cells 13, ensuring the amount of functional material supported, and ensuring the contact area with the air flowing inside the cells 13, it is desirable to suitably combine a thickness of the partition wall 14, a cell density, and a cell pitch (or an opening ratio of the cells 13).

As used herein, the cell density refers a value obtained by dividing a number of cells by an area of one end face (first end face 12*a* or second end face 12*b*) of the honeycomb structure 15 (the total area of the partition walls 14 and the cells 13 excluding the outer peripheral wall 11).

As used herein, the cell pitch refers to a value obtained by the following calculation. First, the area of one end face (first end face 12*a* or second end face 12*b*) of the honeycomb structure 15 (the total area of the partition walls 14 and the cells 13 excluding the outer peripheral wall 11) is divided by the number of the cells to calculate an area per a cell. A square root of the area per a cell is then calculated, and this is determined to be the cell pitch.

As used herein, the opening ratio of the cells 13 refers a value obtained by dividing the total area of the cells 13 defined by the partition walls 14 by the area of one end face 12*b* (first end face 12*a* or second end face 12*b*) (the total area of the partition walls 14 and the cells 13 excluding the outer peripheral wall 11) of the honeycomb structure 15 in the cross section orthogonal to the flow path direction of the honeycomb structure 15. It should be noted that when calculating the opening ratio of the cells 13, the pair of electrodes 16*a*, 16*b*, and the functional material-containing layer 17 are not taken into account.

In an embodiment that is advantageous from the viewpoint of supporting a sufficient amount of functional material, the thickness of the partition wall 14 is 0.300 mm or less, the cell density is 100 cells/cm$^2$ or less, and the cell pitch is 1.0 mm or more. In a preferred embodiment, the thickness of the partition wall 14 is 0.200 mm or less, the cell density is 70 cells/cm$^2$ or less, and the cell pitch is 1.2 mm or more. In a more preferred embodiment, the thickness of the partition wall 14 is 0.130 mm or less, the cell density is 65 cells/cm$^2$ or less, and the cell pitch is 1.3 mm or more.

From the viewpoints of ensuring the strength of the honeycomb structure 15 and maintaining lower electrical resistance, the lower limit of the thickness of the partition wall 14 is preferably 0.010 mm or more, and more preferably 0.020 mm or more, and even more preferably 0.030 mm or more.

From the viewpoints of ensuring the strength of the honeycomb structure 15, maintaining lower electrical resistance, and increasing a surface area to facilitate reaction, adsorption, and release, the lower limit of the cell density is 30 cells/cm$^2$ or more, and preferably 35 cells/cm$^2$ or more, and even more preferably 40 cells/cm$^2$ or more.

From the viewpoints of ensuring the strength of the honeycomb structure 15, maintaining lower electrical resistance and increasing a surface area to facilitate reaction, adsorption and release, the upper limit of the cell pitch is 2.0 mm or less, and more preferably 1.8 mm or less, and even more preferably 1.6 mm or less.

In an embodiment that is advantageous in terms of both reducing pressure loss and maintaining strength, the thickness of the partition wall 14 is 0.08 to 0.36 mm, the cell density is 2.54 to 140 cells/cm$^2$, and the opening ratio of the cells 13 is 0.70 or more. In a preferred embodiment, the thickness of the partition wall 14 is 0.09 to 0.35 mm, the cell density is 15 to 100 cells/cm$^2$, and the opening ratio of the cells 13 is 0.80 or more. In a more preferred embodiment, the thickness of the partition wall 14 is 0.14 to 0.30 mm, the cell density is 20 to 90 cells/cm$^2$, and the opening ratio of the cells 13 is 0.85 or more.

From the viewpoint of ensuring the strength of the honeycomb structure 15, the upper limit of the opening ratio of the cells 13 is preferably 0.94 or less, and more preferably 0.92 or less, and even more preferably 0.90 or less.

Although the thickness of the outer peripheral wall 11 is not particularly limited, it is preferably determined based on the following viewpoints. First, from the viewpoint of reinforcing the honeycomb structure 15, the thickness of the outer peripheral wall 11 is preferably 0.05 mm or more, and more preferably 0.06 mm or more, and even more preferably 0.08 mm or more. On the other hand, the thickness of the outer peripheral wall 11 is preferably 1.0 mm or less, and more preferably 0.5 mm, and more preferably 0.4 mm or less, and still more preferably 0.3 mm or less, from the viewpoint of suppressing the initial current by increasing the electrical resistance and from the viewpoint of reducing pressure loss when air flows.

As used herein, the thickness of the outer peripheral wall 11 refers to a length from a boundary between the outer peripheral wall 11 and the outermost cell 13 or the partition wall 14 to a side surface of the honeycomb structure 15 in a normal line direction of the side surface in the cross section orthogonal to the flow path direction.

The length in the flow path direction and the cross-sectional area orthogonal to the flow path direction of the honeycomb structure 15 may be adjusted according to the required size of the air conditioning device 10, and are not particularly limited. For example, when used in a compact air conditioning device 10 while ensuring a predetermined function, the honeycomb structure 15 can have a length of 2 to 20 mm in the flow path direction and a cross-sectional area of 10 cm$^2$ or more orthogonal to the flow path direction. Although the upper limit of the cross-sectional area orthogonal to the flow path direction is not particularly limited, it is, for example, 300 cm$^2$.

The partition walls 14 forming the honeycomb structure 15 are made of a material that can be heated by electric conduction, specifically made of a material having the PTC property. Further, the outer peripheral wall 11 may also be made of the material having the PTC property, as with the partition walls 14, as needed. By such a configuration, the functional material-containing layer 17 can be directly heated by heat transfer from the heat-generating partition walls 14 (and optionally the outer peripheral wall 11). Further, the material having the PTC property has characteristics such that when the temperature increases to exceed the Curie point, the resistance value is sharply increased, resulting in a difficult for electricity to flow. Therefore, when the temperature of the partition walls 14 (and the outer peripheral wall 11 if necessary) becomes high, the current flowing through them is limited, thereby suppressing excessive heat generation of the honeycomb structure 15. Therefore, it is possible to suppress thermal deterioration of the functional material-containing layer 17 due to excessive heat generation.

The lower limit of the volume resistivity at 25° C. of the material having the PTC property is preferably 0.5 Ω·cm or more, and more preferably 1 Ω·cm or more, and even more preferably 5 Ω·cm or more, from the viewpoint of obtaining appropriate heat generation. The upper limit of the volume resistivity at 25° C. of the material having the PTC property is preferably 30 Ω·cm or less, and more preferably 18 Ω·cm or less, and even more preferably 16 Ω·cm or less, from the viewpoint of generating heat with a low driving voltage. As used herein, the volume resistivity at 25° C. of the material having the PTC property is measured according to JIS K 6271:2008.

From the viewpoints that can be heated by electric conduction and has the PTC property, the outer peripheral wall 11 and the partition walls 14 are preferably made of a material containing barium titanate ($BaTiO_3$) as a main component. Also, this material is more preferably ceramics made of a material containing barium titanate ($BaTiO_3$)-based crystals as a main component in which a part of Ba is substituted with a rare earth element. As used herein, the term “main component” means a component in which a proportion of the component is more than 50% by mass of the total component. The content of $BaTiO_3$-based crystalline particles can be determined by fluorescent X-ray analysis. Other crystalline particles can also be measured by the same method.

The compositional formula of $BaTiO_3$-based crystalline particles, in which a part of Ba is substituted with the rare earth element, can be expressed as $(Ba_{1-x}A_x)TiO_3$. In the compositional formula, the symbol A represents at least one rare earth element, and $0.001 \leq x \leq 0.010$.

The symbol A is not particularly limited as long as it is the rare earth element, but it may preferably be one or more selected from the group consisting of La, Ce, Pr, Nd, Eu, Gd, Dy, Ho, Er, Y and Yb, and more preferably La. The x value is preferably 0.001 or more, and more preferably 0.0015 or more, in terms of suppressing excessively high electrical resistance at room temperature. On the other hand, x is preferably 0.009 or less, in terms of preventing the electrical resistance at room temperature from becoming too high due to insufficient sintering.

The content of the $BaTiO_3$-based crystalline particles in which a part of Ba is substituted with the rare earth element in the ceramics is not particularly limited as long as it is determined to be the main component, but it may preferably be 90% by mass or more, and more preferably 92% by mass or more, and even more preferably 94% by mass or more. The upper limit of the content of the $BaTiO_3$-based crystalline particles is not particularly limited, but it may generally be 99% by mass, and preferably 98% by mass.

The content of the $BaTiO_3$-based crystalline particles can be measured by fluorescent X-ray analysis. Other crystalline particles can be measured in the same manner as this method.

In terms of reduction of the environmental load, it is desirable that the materials used for the outer peripheral wall 11 and the partition walls 14 are substantially free of lead (Pb). More particularly, the outer peripheral wall 11 and the partition walls 14 preferably have a Pb content of 0.01% by mass or less, and more preferably 0.001% by mass or less, and still more preferably 0% by mass. The lower Pb content can allow the air heated by contact with the heat-generating partition walls 14 to be safely applied to organisms such as humans, for example. In the outer peripheral wall 11 and the partition walls 14, the Pb content is preferably less than 0.03% by mass, and more preferably less than 0.01% by mass, and further preferably 0% by mass, as converted to PbO. The lead content can be determined by ICP-MS (inductively coupled plasma mass spectrometry).

The material making up the outer peripheral wall 11 and the partition walls 14 preferably has a Curie point in a temperature range where the resistance value becomes twice or more the resistance value at room temperature (25° C.). If the Curie point is in such a temperature range, the current flowing through the air conditioning device 10 is limited when the air conditioning device 10 reaches a high temperature, so that excessive heat generation of the air conditioning device 10 is efficiently suppressed. Therefore, thermal deterioration of the functional material-containing layer 17 caused by excessive heat generation can be suppressed.

The material making up the outer peripheral wall 11 and the partition walls 14 preferably have a lower limit of a Curie point of 80° C. or more, and more preferably 100° C. or more, and even more preferably 110° C. or more, and still more preferably 125° C. or more, in terms of efficiently heating the functional material-containing layer 17. Further, the upper limit of the Curie point is preferably 200° C. or more, and preferably 190° C. or more, and even more preferably 180° C. or more, and particularly preferably 150° C. or more, in terms of safety as a component placed in the vehicle interior or near the vehicle interior.

The Curie point of the material making up the outer peripheral wall 11 and the partition walls 14 can be adjusted by the type of shifter and an amount of the shifter added. For example, the Curie point of barium titanate ($BaTIO_3$) is about 120° C., but the Curie point can be shifted to the lower temperature side by substituting a part of Ba and Ti with one or more of Sr, Sn and Zr.

As used herein, the Curie point is measured by the following method. A sample is attached to a sample holder for measurement, mounted in a measuring tank (e.g., MINI-SUBZERO MC-810P, from ESPEC), and a change in electrical resistance of the sample as a function of a temperature change when the temperature is increased from 10° C. is measured using a DC resistance meter (e.g., Multimeter 3478A, from YOKOGAWA HEWLETT PACKARD, LTD.). Based on an electrical resistance-temperature plot obtained by the measurement, a temperature at which the resistance value is twice the resistance value at room temperature (20° C.) is defined as the Curie point.

1-2. Pair of Electrodes 16*a*, 16*b*

As shown in FIG. 2A, the pair of electrodes 16*a*, 16*b* are provided on the first end face 12*a* and the second end face 12*b*.

Applying of a voltage between the pair of electrodes 16*a*, 16*b* allows the honeycomb structure 15 to generate heat by Joule heat.

The pair of electrodes 16*a*, 16*b* may employ, for example, a metal or alloy containing at least one selected from Cu, Ag, Al, Ni and Si, although not particularly limited thereto. It is also possible to use an ohmic electrode capable of ohmic contact with the outer peripheral wall 11 and/or the partition walls 14 which have the PTC property. The ohmic electrode may employ an ohmic electrode containing, for example, at least one selected from Al, Au, Ag and In as a base metal, and containing at least one selected from Ni, Si, Zn, Ge, Sn, Se and Te for n-type semiconductors as a dopant. Further, the pair of electrodes 16*a*, 16*b* may have a single-layer structure, or may have a laminated structure of two or more layers. When the pair of electrodes 16*a*, 16*b* have the laminated structure of two or more layers, the materials of the respective layers may be of the same type or of different types.

The thickness of the pair of electrodes 16*a*, 16*b* may be appropriately set according to the method for forming the pair of electrodes 16*a*, 16*b*. The method for forming the pair of electrodes 16*a*, 16*b* includes metal deposition methods such as sputtering, vapor deposition, electrolytic deposition, and chemical deposition. Alternatively, the pair of electrodes 16*a*, 16*b* can be formed by applying an electrode paste and then baking it, or by thermal spraying. Furthermore, the pair of electrodes 16*a*, 16*b* may be formed by joining metal sheets or alloy sheets.

Each of the thicknesses of the pair of electrodes 16*a*, 16*b* is, for example, about 5 to 80 μm for baking the electrode paste, and about 100 to 1000 nm for dry plating such as sputtering and vapor deposition, and about 10 to 100 μm for thermal spraying, and about 5 μm to 30 μm for wet plating such as electrolytic deposition and chemical deposition. Further, when joining the metal sheet or alloy sheet, each of the thicknesses is preferably about 5 to 100 μm.

1-3. Terminal 18

The terminals 18 are connected to the pair of electrodes 16*a*, 16*b* and provided on at least a part of the pair of electrodes 16*a*, 16*b*. The provision of the terminals 18 facilitates connection to an external power source. The terminals 18 are connected to conducing wires connected to the power source 20.

The terminals 18 may be made of any material, including, but not particularly limited to, a metal, for example. The metal that can be used herein may include single metals, alloys, and the like, but from the viewpoint of corrosion resistance, electrical resistivity, and coefficient of linear expansion, it may preferably be alloys containing at least one selected from the group consisting of Cr, Fe, Co, Ni, Cu, Al, and Ti, and more preferably stainless steel, Fe—Ni alloy, and phosphor bronze.

The size and shape of the terminal 18 are not particularly limited. For example, as shown in FIG. 2A, the terminals 18 can be provided on the whole of the pair of electrodes 16*a*, 16*b* on the outer peripheral wall 11. Further, the terminals 18 may be provided on a part of the pair of electrodes 16*a*, 16*b* on the outer peripheral wall 11, or may be provided so as to extend toward an outer side than the outer edge of each of the pair of electrodes 16*a*, 16*b* on the outer peripheral wall 11. Further, the terminals 18 may be provided on a part of the pair of electrodes 16*a*, 16*b* on the partition walls 14, or may be provided so as to block a part of the cells 13.

Furthermore, the thickness of the terminal 18 is not particularly limited, but it is, for example, 0.01 to 10 mm, typically 0.05 to 5 mm.

The method of connecting the terminals 18 to the pair of electrodes 16*a*, 16*b* is not particularly limited as long as they are electrically connected. For example, they can be connected by diffusion bonding, a mechanical pressing mechanism, welding, or the like.

1-4. Functional Material-Containing Layer 17

The functional material-containing layer 17 can be provided on the surfaces of the partition walls 14 (in the case of the outermost cells 13, the partition walls 14 that define the outermost cells 13 and the outer peripheral wall 11). By thus providing the functional material-containing layer 17, the functional material-containing layer 17 can be easily heated during regeneration, so that the desired function by the functional material-containing layer 17 can be regenerated.

The functional material contained in the functional material-containing layer 17 is not particularly limited as long as it is a material that can exhibit a desired function, and examples that can be used herein include adsorbents, catalysts, and the like. The adsorbent preferably has a function of adsorbing the components to be removed in the air, for example, at least one selected from water vapor, carbon dioxide and volatile components. Also, the use of the catalyst can purify the components to be removed. Furthermore, the adsorbent and the catalyst may be used together for the purpose of enhancing the function of the absorbent to capture the components to be removed.

The adsorbent preferably has a function that can adsorb the components to be removed, such as water vapor, carbon dioxide and volatile components at −20 to 40° C. and release them at an elevated temperature of 60° C. or more. Examples of the adsorbent having such functions include zeolite, silica gel, activated carbon, alumina, silica, low-crystalline clay, amorphous aluminum silicate complexes, and the like. The type of the adsorbent may be appropriately selected depending on the types of the components to be removed. The adsorbent may be used alone, or in combination with two or more types.

Among the adsorbents, especially when water vapor is to be adsorbed, a moisture absorbent is used as the adsorbent. Examples of the moisture absorbent include, but not limited to, aluminosilicate, silica gel, silica, graphene oxide, polymer moisture absorbents, polystyrene sulfonic acid, and metal organic frameworks (MOFs: Metal Organic Frameworks). These may be used alone or in combination of two or more.

Examples of the aluminosilicate that can be preferably used herein include AFI type-, CHA type-, or BEA type-zeolite; and porous clay minerals such as allophane and imogolite. Also, it is more preferable that the aluminosilicate is amorphous.

Examples of the silica gel that can be preferably used herein include type A silica gel.

Examples of the polymer moisture adsorbents that can be preferably used herein include those having a polyacrylic acid polymer chain. For example, sodium polyacrylate or the like can be used as the polymer moisture adsorbent.

The metal organic framework is a crystalline hybrid material containing metal ions and organic molecules (organic ligands). The metal ions are preferably hydrophilic metal ions (for example, aluminum ions).

The catalyst preferably has a function capable of promoting the oxidation-reduction reaction. The catalysts having such functions include metal catalysts such as Pt, Pd and Ag, and oxide catalysts such as $CeO_2$ and $ZrO_2$. The catalyst may be used alone, or in combination with two or more types.

The volatile components contained in the air in the vehicle interior include, for example, volatile organic compounds (VOCs), and odor components other than the VOCs Specific examples of the volatile components include ammonia, acetic acid, isovaleric acid, nonenal, formaldehyde, toluene, xylene, paradichlorobenzene, ethylbenzene, styrene, chlorpyrifos, di-n-butyl phthalate, tetradecane, and di-2-ethylhexyl phthalate, diazinon, acetaldehyde, 2-(1-methylpropyl)phenyl N-methylcarbamate, and the like.

The thickness of the functional material-containing layer 17 may be determined according to the size of the cells 13, and is not particularly limited. For example, the thickness of the functional material-containing layer 17 is preferably 20 μm or more, and more preferably 25 μm or more, and even more preferably 30 μm or more, from the viewpoint of ensuring sufficient contact with air. On the other hand, the thickness of the functional material-containing layer 17 is preferably 400 μm or less, and more preferably 380 μm or less, and even more preferably 350 μm or less, from the viewpoint of suppressing separation of the functional material-containing layer 17 from the partition walls 14 and the outer peripheral wall 11.

The thickness of the functional material-containing layer 17 is measured using the following procedure. Any cross section parallel to the flow path direction of the honeycomb structure 15 is cut out, and a cross-sectional image at magnifications of about 50 is acquired using a scanning electron microscope or the like. Also, this cross section is made to pass through the center of gravity position in the cross section orthogonal to the flow path of the honeycomb structure 15. The thickness of each functional material-containing layer 17 visually recognized from the cross-sectional image is calculated by dividing the cross-sectional area by the length of the cells 13 in the flow path direction. This calculation is performed for all the functional material-containing layers 17 visually recognized from the cross-sectional image, and an average value thereof is determined to be the thickness of the functional material-containing layer 17.

From the viewpoint that the functional material exhibits a desired function in the air conditioning device 10, an amount of the functional material-containing layer 17 is preferably 50 to 500 g/L, and more preferably 100 to 400 g/L, and even more preferably 150 to 350 g/L, based on the volume of the honeycomb structure 15. It should be noted that the volume of the honeycomb structure 15 is a value determined by the external dimensions of the honeycomb structure 15.

1-5. Method for Producing Air Conditioning Device 10

The method for producing the air conditioning device 10 is not particularly limited, and it can be performed according to a known method. Hereinafter, the method for producing the air conditioning device 10 will be illustratively described.

A method for producing the honeycomb structure 15 forming the air conditioning device 10 includes a forming step and a firing step.

In the forming step, a green body containing a ceramic raw material including $BaCO_3$ powder, $TiO_2$ powder, and rare earth nitrate or hydroxide powder is formed to prepare a honeycomb formed body having a relative density of 60% or more.

The ceramic raw material can be obtained by dry-mixing the powders so as to have a desired composition.

The green body can be obtained by adding a dispersion medium, a binder, a plasticizer and a dispersant to the ceramic raw material and kneading them. The green body may optionally contain additives such as shifters, metal oxides, property improving agents, and conductor powder.

The blending amount of the components other than the ceramic raw material is not particularly limited as long as the relative density of the honeycomb formed body is 60% or more.

As used herein, the "relative density of the honeycomb formed body" means a ratio of the density of the honeycomb formed body to the true density of the entire ceramic raw material. More particularly, the relative density can be determined by the following equation:

$$\text{relative density of honeycomb formed body } (\%) = \text{density of honeycomb formed body } (g/cm^3) / \text{true density of entire ceramic raw material } (g/cm^3) \times 100.$$

The density of the honeycomb formed body can be measured by the Archimedes method using pure water as a medium. Further, the true density of the entire ceramic raw material can be obtained by dividing the total mass of the respective raw materials (g) by the total volume of the actual volumes of the respective raw materials ($cm^3$).

Examples of the dispersion medium include water or a mixed solvent of water and an organic solvent such as alcohol, and more preferably water.

Examples of the binder include organic binders such as methyl cellulose, hydroxypropoxyl cellulose, hydroxyethyl cellulose, carboxymethyl cellulose, and polyvinyl alcohol. In particular, it is preferable to use methyl cellulose in combination with hydroxypropoxyl cellulose. The binder may be used alone, or in combination of two or more, but it is preferable that the binder does not contain an alkali metal element.

Examples of the plasticizer include polyoxyalkylene alkyl ethers, polycarboxylic acid-based polymers, and alkyl phosphate esters.

The dispersant that can be used herein includes surfactants such as polyoxyalkylene alkyl ether, ethylene glycol, dextrin, fatty acid soaps, and polyalcohol. The dispersant may be used alone or in combination of two or more.

The honeycomb formed body can be produced by extrude the green body. In the extrusion, a die having a desired overall shape, cell shape, partition wall thickness, cell density and the like can be used.

The relative density of the honeycomb formed body obtained by extrusion is 60% or more, and preferably 65% or more. By controlling the relative density of the honeycomb formed body to such a range, the honeycomb formed body can be densified and the electrical resistance at room temperature can be reduced. The upper limit of the relative density of the honeycomb formed body is not particularly limited, but it may generally be 80%, and preferably 75%.

The honeycomb formed body can be dried before the firing step. Non-limiting examples of the drying method include conventionally known drying methods such as hot air drying, microwave drying, dielectric drying, drying under reduced pressure, drying in vacuum, and freeze drying. Among these, a drying method that combines the hot air drying with the microwave drying or dielectric drying is preferable in that the entire formed body can be rapidly and uniformly dried.

The firing step includes maintaining the formed body at a temperature of from 1150 to 1250° C., and then increasing the temperature to a maximum temperature of from 1360 to 1430° C. at a heating rate of 20 to 600° C./hour, and maintaining the temperature for 0.5 to 10 hours.

The maintaining of the honeycomb formed body at the maximum temperature of from 1360 to 1430° C. for 0.5 to 10 hours can provide the honeycomb structure 15 containing, as a main component, $BaTiO_3$-based crystal particles in which a part of Ba is substituted with the rare earth element.

Further, the maintaining at the temperature of from 1150 to 1250° C. can allow the $Ba_2TiO_4$ crystal particles generated in the firing process to be easily removed, so that the honeycomb structure 15 can be densified.

Further, the heating rate of 20 to 600° C./hour from the temperature of 1150 to 1250° C. to the maximum temperature of 1360 to 1430° C. can allow 1.0 to 10.0% by mass of $Ba_6Ti_{17}O_{40}$ crystal particles to be formed in the honeycomb structure 15.

The maintaining time at 1150 to 1250° C. is not particularly limited, but it may preferably be from 0.5 to 10 hours. Such a maintaining time can lead to stable and easy removal of $Ba_2TiO_4$ crystal particles generated in the firing process.

The firing step preferably includes maintaining at 900 to 950° C. for 0.5 to 5 hours during the increasing of the temperature. The maintaining at 900 to 950° C. for 0.5 to 5 hours can lead to sufficient decomposition of $BaCO_3$, so that the honeycomb structure 15 having a predetermined composition can be easily obtained.

Prior to the firing step, a degreasing step for removing the binder may be performed. The degreasing step may preferably be performed in an air atmosphere in order to decompose the organic components completely.

Also, the atmosphere of the firing step may preferably be the air atmosphere in terms of control of electrical characteristics and production cost.

A firing furnace used in the firing step and the degreasing step is not particularly limited, but it may be an electric furnace, a gas furnace, or the like.

On the honeycomb structure 15 thus obtained, the pair of electrodes 16*a*, 16*b* are formed. The pair of electrodes 16*a*, 16*b* can be formed by metal deposition methods such as sputtering, vapor deposition, electrolytic deposition, and chemical deposition. Further, the pair of electrodes 16*a*, 16*b* can also be formed by applying an electrode paste and then baking it. Furthermore, the pair of electrodes 16*a*, 16*b* can also be formed by thermal spraying. The pair of electrodes 16*a*, 16*b* may be composed of a single layer, but may also be composed of a plurality of electrode layers having different compositions. A typical method for forming the pair of electrodes 16*a*, 16*b* will be described below.

First, an electrode slurry containing an electrode material, an organic binder, and a dispersion medium is prepared, and the first end face 12*a* or the second end face 12*b* of the honeycomb structure 15 is coated with the slurry. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. An excess slurry on the periphery of the honeycomb structure 15 is removed by blowing and wiping. The slurry can be then dried to form the pair of electrodes 16*a*, 16*b* on the first end face 12*a* or the second end face 12*b* of the honeycomb structure 15. The drying can be performed while heating the vehicle air conditioning system to a temperature of about 120 to 600° C., for example. Although a series of steps of coating, slurry removal, and drying may be performed only once, the steps can be repeated multiple times to provide the pair of electrodes 16*a*, 16*b* having desired thicknesses.

When the terminals 18 are provided, they are then disposed at predetermined positions of the pair of electrodes 16*a*, 16*b*, and the pair of electrodes 16*a*, 16*b* and the terminals 18 are connected to each other. As a method of connecting the pair of electrodes 16*a*, 16*b* to the terminals 18, the method described above can be used.

It should be noted that the terminals 18 may be disposed after forming a functional material-containing layer 17 described below.

The functional material-containing layer 17 is then formed on the surfaces of the partition walls 14 and the like of the honeycomb structure 15.

Although the method for forming the functional material-containing layer 17 is not particularly limited, it can be formed, for example, by the following steps. The honeycomb structure 15 is immersed in a slurry containing a functional material, an organic binder, and a dispersion medium for a predetermined period of time, and an excess slurry on the end faces and the outer periphery of the honeycomb structure 15 is removed by blowing and wiping. The dispersion medium can be water, an organic solvent (e.g., toluene, xylene, ethanol, n-butanol, ethyl acetate, butyl acetate, terpineol, dihydroterpineol, texanol, ethylene glycol monobutyl ether acetate, diethylene glycol monoethyl ether acetate, diethylene glycol monoethyl ether, diethylene glycol monobutyl ether acetate, diethylene glycol monobutyl ether) or a mixture thereof. The slurry can be then dried to form the functional material-containing layer 17 on the surfaces of the partition walls 14. The drying can be performed while heating the honeycomb structure 15 to a temperature of about 120 to 600° C., for example. Although a series of steps of immersion, slurry removal, and drying may be performed only once, the steps can be repeated multiple times to provide the functional material-containing layer 17 having the desired thickness on the surfaces of the partition walls 14 and the like.

2. Power Source 20

The power source 20 is for applying a voltage to the pair of electrodes 16*a*, 16*b*. The power source 20 is electrically connected to the control unit 90, and adjusts the state of the voltage applied to the pair of electrodes 16*a*, 16*b* according to instructions from the control unit 90.

The power source 20 is not particularly limited, and a battery or the like can be used.

3. Inflow Pipe 30

The inflow pipe 30 is a pipe for allowing the air from the vehicle interior or the vehicle exterior to flow into the air conditioning device 10.

The shape and size of the inflow pipe 30 may be adjusted as needed depending on the type of the vehicle, and they are not particularly limited.

4. First Outflow Pipe 40 and Second Outflow Pipe 50

The first outflow pipe 40 is a pipe for returning the air that has passed through the air conditioning device 10 to the vehicle interior, and the second outflow pipe 50 is a pipe for discharging the air that has passed through the air conditioning device 10 to the vehicle exterior.

The shape, size and the like of the first outflow pipe 40 and the second outflow pipe 50 may be adjusted as needed depending on the type of the vehicle, and they are not particularly limited. Further, the first outflow pipe 40 and the second outflow pipe 50 may be separate pipes from the inflow pipe 30, or may be pipes formed integrally with the inflow pipe 30.

The first outflow pipe 40 and the second outflow pipe 50 preferably have a double pipe structure in which the second outflow pipe 50 is disposed within the first outflow pipe 40 at a branch portion between the first outflow pipe 40 and the second outflow pipe 50. Such a configuration allows the structure around the branch portion between the first outflow pipe 40 and the second outflow pipe 50 to be made compact, and also allows a commercially available differential pressure valve 60 to be used at the branch portion.

5. Differential Pressure Valve 60

The differential pressure valve 60 is provided at the branch portion between the first outflow pipe 40 and the second outflow pipe 50, and can switch the flow of the air to the first outflow pipe 40 or the second outflow pipe 50.

The differential pressure valve 60 is not particularly limited as long as it can be disposed at the branch portion between the first outflow pipe 40 and the second outflow pipe 50, and can open and close the flow path of the first outflow pipe 40 or the second outflow pipe 50 depending on the pressure inside the pipe.

For example, as shown in FIGS. 3A and 3B, the differential pressure valve 60 includes: a base portion 61; opening and closing portions 62*a*, 62*b*; and spring portions 63*a*, 63*b* connecting the base portion 61 to the opening and closing portions 62*a*, 62*b*. The differential pressure valve 60 having such a structure can control the pressure for opening the opening and closing portions 62*a*, 62*b* by adjusting the strength of the spring portions 63*a*, 63*b*.

6. First Ventilator 70

The first ventilator 70 is provided to control the differential pressure valve 60 to switch the flow of the air to the first outflow pipe 40. That is, the first ventilator 70 is provided to control the opening and closing portion 62*a* of the differential pressure valve 60 to an opened state.

The first ventilator 70 is not particularly limited, and any known ventilator can be used.

The position of the first ventilator 70 is not particularly limited as long as it is a position where the differential pressure valve 60 can be controlled as described above.

For example, the first ventilator 70 can be disposed within the inflow pipe 30. When the first ventilator 70 is disposed at such a position, the interior of the pipe on the upstream side of the differential pressure valve 60 becomes positive pressure when the first ventilator 70 is activated. Due to the positive pressure, only the opening and closing portion 62*a* of the differential pressure valve 60 becomes opened, and the air flows into the first outflow pipe 40.

In order to open only the opening and closing portion 62*a* of the differential pressure valve 60 by the positive pressure, the spring portion 63*a* may be set to the strength sufficient to open that portion by the positive pressure, and the spring portion 63*b* may be set to the strength sufficient not to open that portion by the positive pressure.

Further, the first ventilator 70 may be disposed within the first outflow pipe 40 on the downstream side of the differential pressure valve 60. When the first ventilator 70 is disposed at such a position, the interior of the first outflow pipe 40 between the differential pressure valve 60 and the first ventilator 70 becomes negative pressure when the first ventilator 70 is activated. Due to the negative pressure, only the opening and closing portion 62*a* of the differential pressure valve 60 becomes opened, and the air flows into the first outflow pipe 40. In this case, the strengths of the spring portion 63*a* and the spring portion 63*b* of the differential pressure valve 60 may be approximately the same.

7. Second Ventilator 80

The second ventilator 80 is provided to control the differential pressure valve 60 to switch the flow of the air to the second outflow pipe 50. That is, the second ventilator 80 is provided to control the opening and closing portion 62*b* of the differential pressure valve 60 to an opened state.

The second ventilator 80 is not particularly limited, and any known ventilator can be used.

The position of the second ventilator 80 is not particularly limited as long as it is a position where the differential pressure valve 60 can be controlled as described above.

For example, the second ventilator 80 can be disposed within the second outflow pipe 50. When the second ventilator 80 is disposed at such a position, the interior of the second outflow pipe 50 between the differential pressure valve 60 and the second ventilator 80 becomes negative pressure when the second ventilator 80 is activated. Due to the negative pressure, only the opening and closing portion 62*b* of the differential pressure valve 60 becomes opened, and the air flows into the second outflow pipe 50.

8. Control Unit 90

The control unit 90 can be provided to control the power source 20, the first ventilator 70, the second ventilator 80, and the like. The control unit 90 is electrically connected to the power source 20, the first ventilator 70, the second ventilator 80, and the like.

The control unit 90 can adjust the heating state of the honeycomb structure 15 by controlling the power source 20 for applying the voltage to the pair of electrodes 16*a*, 16*b* of the air conditioning device 10. Further, the control unit 90 can be controlled to activate the first ventilator 70 and switch the flow of the air at the differential pressure valve 60 to the first outflow pipe 40. Further, the control unit 90 can be controlled to activate the second ventilator 80 and switch the flow of the air at the differential pressure valve 60 to the second outflow pipe 50.

The control unit 90 is generally an ECU (Engine (electronic) Control Unit), although not particularly limited thereto. The ECU includes a CPU for performing various calculation processes, a ROM for storing programs and data required for its control, a RAM for temporarily storing results of calculations performed by the CPU, and input/output ports for inputting and outputting signals to and from the outside.

The control unit 90 can preferably execute both the air conditioning mode where the air conditioning in the vehicle interior is performed by activating the first ventilator 70 and controlling the differential pressure valve 60 to switch the flow of the air to the first outflow pipe 40; and the regeneration mode where the regeneration of the functional material-containing layer 17 is performed by activating the second ventilator 80, applying a voltage to the pair of electrodes 16*a*, 16*b* of the air conditioning device 10, and controlling the differential pressure valve 60 to switch the flow of the air to the second outflow pipe 50. If such modes are executable, the components to be removed contained in the air from the vehicle interior can be removed and returned to the vehicle interior in the air conditioning mode, and the components to be removed trapped by the functional material-containing layer 17 can be discharged to the vehicle exterior in the regeneration mode.

In particular, when the functional material-containing layer 17 contains the moisture absorbent, the control unit 90 can preferably actuate both a dehumidification mode where the vehicle interior is dehumidified by activating the first ventilator 70 and controlling the differential pressure valve 60 to switch the flow of the air to the first outflow pipe 40; and a regeneration mode where the functional material-containing layer 17 is regenerated by activating the second ventilator 80, and applying a voltage to the pair of electrodes 16*a*, 16*b* of the air conditioning device 10, and controlling the differential pressure valve 60 to switch the flow of the air to the second outflow pipe 50. If such modes are executable, the moisture contained in the air from the vehicle interior can be removed and returned to the vehicle interior in the dehumidification mode, and the moisture trapped by the functional material-containing layer 17 can be discharged to the vehicle exterior in the regeneration mode.

The vehicle air conditioning system 100 further includes a detection portion (not shown) capable of detecting fogging of the glass in the vehicle interior, and it is preferable that the control unit 90 executes the regeneration mode when the fogging of the glass in the vehicle interior is detected, and executes the dehumidification mode when the fogging of the glass in the vehicle is not detected. Such a control can efficiently regenerate the functional material-containing layer 17 while suppressing the fogging of the glass in the vehicle interior.

The detection portion capable of detecting the fogging of the glass in the vehicle interior is not particularly limited, but it is preferable to detect the fogging of the glass in the vehicle interior based on the temperature and humidity in the vehicle interior. The detection portion having such a function can stably detect the fogging of the glass.

In the regeneration mode of the functional material-containing layer 17 containing the moisture absorbent, the functional material-containing layer 17 is preferably heated to a temperature higher than the desorption temperature depending on the type of the moisture absorbent in order to promote the release of the moisture captured in the functional material-containing layer 17. For example, the functional material-containing layer 17 is preferably heated to 70 to 150° C., and more preferably 80 to 140° C., and even more preferably heated to 90 to 130° C.

From the viewpoint of stably performing the above control, it is desirable that the air conditioning device 10 be placed at a position close to the vehicle interior. Therefore, from the viewpoint of preventing electric shock and the like, it is preferable that the driving voltage of the air conditioning device 10 is 60V or less. Since the honeycomb structure 15 used in the air conditioning device 10 has a low electrical resistance at room temperature, the honeycomb structure 15 can be heated at the low driving voltage. It should be noted that the lower limit of the driving voltage is not particularly limited, but it may preferably be 10 V or more. If the driving voltage is less than 10V, the current during heating the honeycomb structure 15 becomes large, so that the conductor wire should be thick.

DESCRIPTION OF REFERENCE NUMERALS

10 air conditioning device
11 outer peripheral wall
12*a* first end face
12*b* second end face
13 cell
14 partition wall
15 honeycomb structure
16*a*, 16*b* pair of electrodes
17 functional material-containing layer
18 terminal
20 power source
30 inflow pipe
40 first outflow pipe
50 second outflow pipe
60 differential pressure valve
61 base portion
62*a*, 62*b* opening and closing portion
63*a*, 63*b* spring portion
70 first ventilator
80 second ventilator
90 control unit
100 vehicle air conditioning system

The invention claimed is:

1. A vehicle air conditioning system, comprising:

an air conditioning device comprising: a honeycomb structure having an outer peripheral wall and partition walls disposed on an inner side of the outer peripheral wall, the partition walls defining a plurality of cells, each of the cells extending from a first end face to a second end face to form a flow path, at least the partition walls being made of a material having a positive temperature coefficient (PTC) property; a pair of electrodes provided on the first end face and the second end face; and a functional material-containing layer formed on a surface of each of the partition walls;

a power source for applying voltage to the pair of electrodes;

an inflow pipe for allowing air from a vehicle interior or a vehicle exterior to flow into the air conditioning device;

a first outflow pipe for returning the air that has passed through the air conditioning device to the vehicle interior;

a second outflow pipe for discharging the air that has passed through the air conditioning device to the vehicle exterior;

a differential pressure valve provided at a branch portion between the first outflow pipe and the second outflow pipe, the differential pressure valve being capable of switching the flow of the air to the first outflow pipe or the second outflow pipe;

a first ventilator for controlling the differential pressure valve to switch the flow of the air to the first outflow pipe; and a second ventilator for controlling the differential pressure valve to switch the flow of the air to the second outflow pipe.

2. The vehicle air conditioning system according to claim 1, wherein the first outflow pipe and the second outflow pipe have a double pipe structure in which the second outflow pipe is disposed within the first outflow pipe at the branch portion between the first outflow pipe and the second outflow pipe.

3. The vehicle air conditioning system according to claim 1, wherein the first ventilator is disposed in the inflow pipe.

4. The vehicle air conditioning system according to claim 1, wherein the second ventilator is disposed in the second outflow pipe.

5. The vehicle air conditioning system according to claim 1, wherein the material having the PTC property comprises barium titanate as a main component.

6. The vehicle air conditioning system according to claim 1, wherein the functional material-containing layer comprises an adsorbent having a function of adsorbing at least one selected from water vapor, carbon dioxide, and volatile components.

7. The vehicle air conditioning system according to claim 6, wherein the adsorbent is a moisture absorbent.

8. The vehicle air conditioning system according to claim 7, further comprising a control unit, wherein the control unit can execute:

a dehumidification mode where the vehicle interior is dehumidified by activating the first ventilator and controlling the differential pressure valve to switch the flow of the air to the first outflow pipe; and a regeneration mode where the functional material-containing layer is regenerated by activating the second ventilator, applying a voltage to the pair of electrodes of the air conditioning device, and controlling the differential pressure valve to switch the flow of the air to the second outflow pipe.

9. The vehicle air conditioning system according to claim 8, further comprising a detection portion capable of detecting fogging of glass in the vehicle interior, wherein the control portion executes the regeneration mode when the fogging of the glass is detected, and the control portion executes the dehumidification mode when the fogging of the glass is not detected.

10. The vehicle air conditioning system according to claim 9, wherein the detection portion detects the fogging of the glass based on a temperature and a humidity in the vehicle interior.

11. The vehicle air conditioning system according to claim 1, wherein the functional material-containing layer comprises a catalyst.

* * * * *